UNITED STATES PATENT OFFICE.

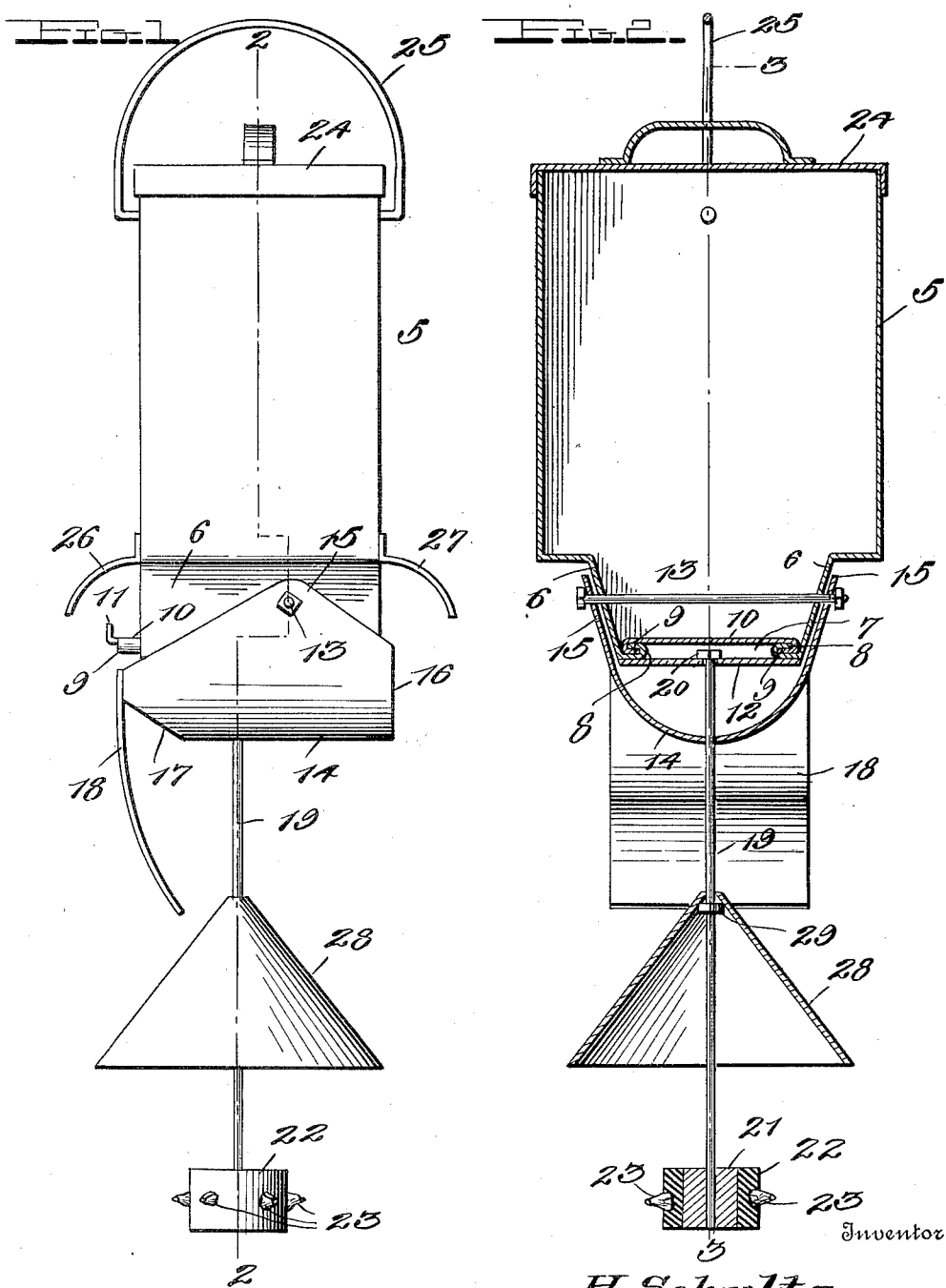

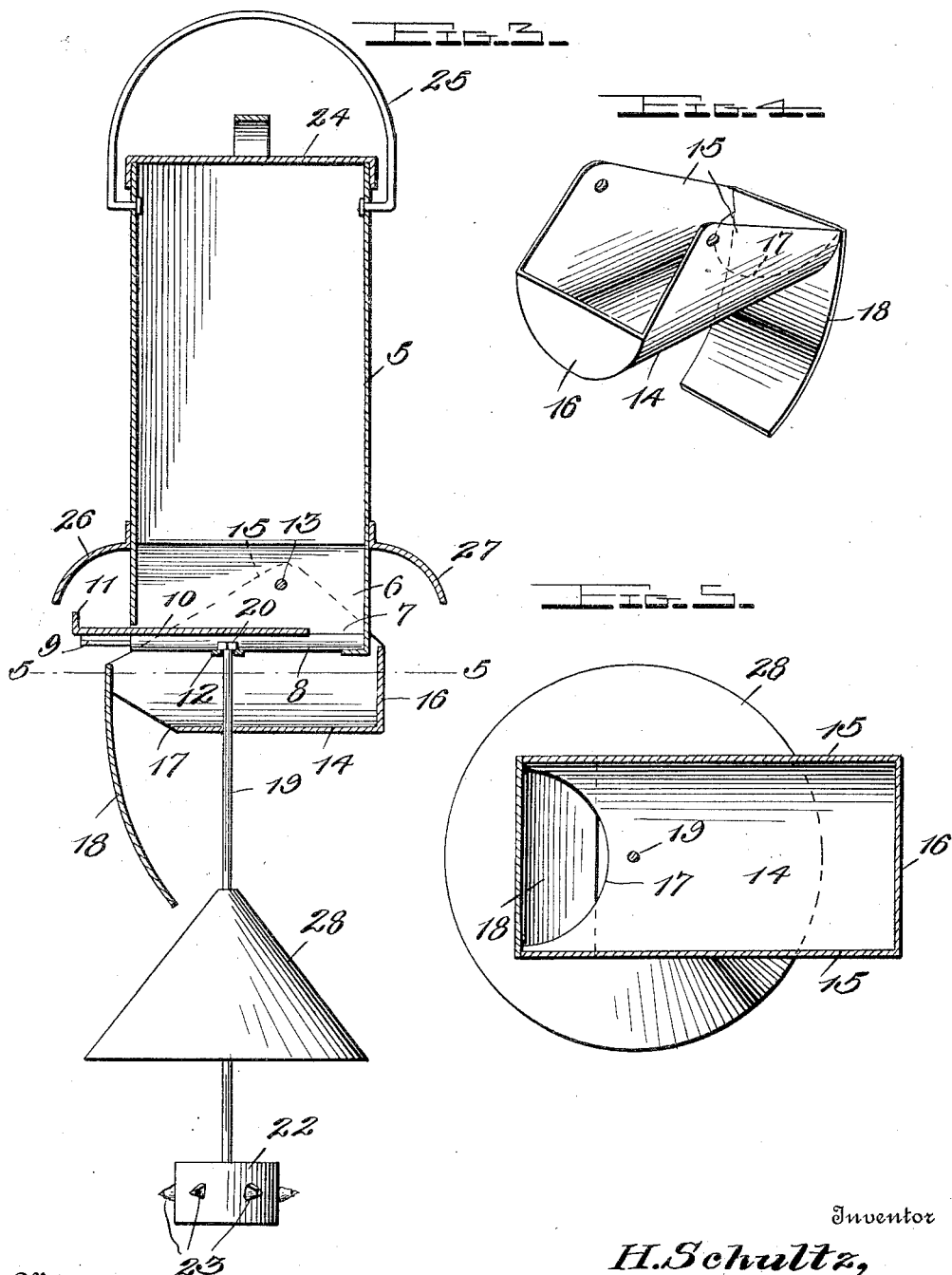

HERMAN SCHULTZ, OF PARKERSBURG, IOWA.

POULTRY-FEEDER.

1,071,097.

Specification of Letters Patent.   Patented Aug. 26, 1913.

Application filed August 3, 1912.   Serial No. 713,126.

*To all whom it may concern:*

Be it known that I, HERMAN SCHULTZ, a citizen of the United States, residing at Parkersburg, in the county of Butler and State of Iowa, have invented certain new and useful Improvements in Poultry-Feeders, of which the following is a specification, reference being had to the accompanying drawings.

This invention relates to improvements in poultry feeders and has for its primary object to provide a simple, inexpensive and efficient device of this character which is actuated by the fowls thereby also serving as an exerciser to maintain the fowls in a healthy condition and greatly increase their egg production.

Another and more specific object of the invention resides in the provision of a hopper to contain the feed, an oscillatory trough mounted upon the hopper and a regulating plate to admit the feed in the desired quantities from the trough into the hopper, and means connected to the hopper and depending therefrom whereby the hopper is oscillated when said means is moved by the fowls to cause the feed to gravitate outwardly and downwardly to one end of the hopper.

Another object of the invention is to provide improved means for directing and scattering the feed after it is discharged from the trough over a comparatively wide area.

With the above and other objects in view, the invention consists in the novel features of construction and the combination and arrangement of parts hereinafter more fully described, pointed out in the claim and shown in the accompanying drawings in which—

Figure 1 is a side elevation of a poultry feeding device embodying the present invention. Fig. 2 is a section taken on the line 2—2 of Fig. 1. Fig. 3 is a section taken on the line 3—3 of Fig. 2. Fig. 4 is a detail perspective view of the trough. Fig. 5 is a horizontal section taken on the line 5—5 of Fig. 3.

Referring in detail to the drawing, 5 designates a hopper which in the illustrated embodiment of the invention is shown as of rectangular form in cross section though it will be obvious that this hopper may be cylindrical, hexagonal, or of any other desired shape. The lower end of the hopper is reduced as indicated at 6, the bottom of said reduced portion being provided with the outlet opening 7 for the feed. This hopper is preferably constructed of sheet metal and at the opposite edges of the opening 7, the metal is reversely bent or looped to form guide ways 8. These guide ways receive the inwardly bent edges 9 of a sliding feed regulating plate 10. The outer end of this plate is bent or flanged upwardly as at 11 to provide a suitable handle whereby said plate may be conveniently moved in the guide ways 8 to regulate the size of the opening in the bottom of the hopper through which the feed is permitted to escape. The guide ways 8 are connected centrally between their ends by a cross bar 12.

A rod 13 is disposed through the opposite side walls of the lower reduced end 6 of the hopper 5, and upon this rod the feed receiving trough 14 is mounted to oscillate, the side walls 15 of the trough being vertically extended and provided with apertures which loosely receive the rod 13. One end of this trough, which will be designated for convenience as the rear end thereof, is closed by the wall 16, the upper edge of which extends above the lower edge of the rear wall of the hopper 5. The bottom of the trough 14 is provided with an opening 17 at its forward end, and the side walls of the hopper are connected at their forward ends by means of the plate 18. This plate extends downwardly and is rearwardly curved beneath the trough as clearly shown in Fig. 1.

A pendule 19 has its upper end loosely mounted in the cross bar 12 which connects the guide ways 8 wherein the sliding feed regulating plate is mounted. This pendule is in the form of a rod upon the upper end of which a nut 20 is threaded. To the lower end of the pendule 19 a cylindrical block 21, preferably of wood is secured, and this block is provided with a covering or casing of rubber indicated at 22. This rubber casing has a number of openings formed therein in which grains of corn shown at 23 are securely held. A suitable top 24 may be provided for the hopper 5 and the ends of a bail 25 are attached to opposite side walls of said hopper whereby the feeder may be suspended from a hook or other element.

In order to prevent rain entering the trough 14, I provide a shield or guard plates 26 and 27 respectively, the plate 26 being fixed to the front wall of the hopper 5 and extending outwardly and downwardly over the forward end of the oscillating trough. The rear shield plate 27 is disposed over the upper edge of the rear wall of the trough. These plates will effectually prevent sparrows obtaining access to the feed in the trough and will also exclude rain and moisture therefrom which has a deteriorating effect upon the corn.

For the purpose of scattering the feed over a comparatively wide area, I provide the conical or inverted funnel shaped member 28 which is mounted upon the pendule 19 at a point adjacent the lower end of the curved plate 17. This scattering member is held against downward movement by means of a collar 29 fixed upon the rod or pendule 19 in any preferred manner.

In the operation of my improved feeder, the fowls are attracted by the grains of corn secured upon the block on the lower end of the rod 18 in the manner above stated. As the fowls strike the rubber covering 22 with their bills, the pendule 19 will be moved or swung, thereby also oscillating the trough 14 upon the rod 13. The feed regulating plate 10 being properly adjusted, the feed which enters the trough will gravitate to the forward end thereof as the trough is oscillated and escape through the opening 17 in the bottom of the trough. The feed will strike upon the concave surface of the curved plate 18 and be directed by the same upon the conical member 28. From this member the grain moves downwardly and outwardly and is scattered over the ground. By means of my device, it will be seen that in order for the fowls to obtain the feed, they must exert themselves by striking the rubber covered block 21 on the lower end of the pendule 19. In this manner, the fowls are exercised and kept in a healthy condition. It has also been demonstrated that the production of eggs may be greatly increased by providing means whereby the fowls are exercised. My improved poultry feeder also results in the saving of considerable feed, as the hopper is suspended out of the reach of the fowl so that its contents cannot be wasted. The device is of comparatively simple construction, may be inexpensively manufactured and is very durable as well as efficient in practical use.

While I have shown and described the preferred construction and arrangement of the various elements it will be obvious that the invention is susceptible of considerable modification without departing from the essential features or sacrificing any of the advantages thereof.

What I claim is:—

A poultry feeder, including a hopper having a discharge opening and an oscillating trough mounted underneath said opening and adapted to receive the grain therefrom, a pendulous rod arranged to swing said trough, a scattering device carried by and movable with said rod, the trough being formed with a discharge opening, and a directing plate carried by the trough and defining one side of the discharge opening of the trough and extending down toward the scattering device, whereby when the rod is moved, it will swing the trough and scattering device with it as well as the directing plate and whereby the latter will serve to direct the grain down onto the surface of the swinging scattering device.

In testimony whereof I hereunto affix my signature in the presence of two witnesses.

HERMAN SCHULTZ.

Witnesses:
T. R. TAMMEN,
H. W. WILHELMS.

Copies of this patent may be obtained for five cents each, by addressing the "Commissioner of Patents, Washington, D. C."